(12) United States Patent
Xu et al.

(10) Patent No.: US 10,623,746 B2
(45) Date of Patent: Apr. 14, 2020

(54) METHOD AND APPARATUS FOR VIDEO CODING

(71) Applicant: Tencent America LLC, Palo Alto, CA (US)

(72) Inventors: Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/182,814

(22) Filed: Nov. 7, 2018

(65) Prior Publication Data

US 2019/0182489 A1 Jun. 13, 2019

Related U.S. Application Data

(60) Provisional application No. 62/595,955, filed on Dec. 7, 2017.

(51) Int. Cl.
*H04N 19/176* (2014.01)
*H04N 19/156* (2014.01)
(Continued)

(52) U.S. Cl.
CPC ......... *H04N 19/156* (2014.11); *H04N 19/115* (2014.11); *H04N 19/119* (2014.11);
(Continued)

(58) Field of Classification Search
CPC ... H04N 19/109; H04N 19/119; H04N 19/176
(Continued)

(56) References Cited

U.S. PATENT DOCUMENTS 8,526,495 B2 9/2013 Liu et al.
8,929,460 B1 * 1/2015 Yie ...................... H04N 19/176
375/240.25
(Continued)

OTHER PUBLICATIONS

S. Liu, X. Zhang, S. Lei, "Non-CE6: Rectangular (2NxN and Nx2N) Intra Prediction", JCTVC-G0135, Joint Collaborative Team on Video Coding (JCTVC), of ITU-T SG 16 WP 3 and ISO/IEC JTC 1/SC 29/WG 11, Geneva, Nov. 2011.
(Continued)

*Primary Examiner* — Jeremiah C Hallenbeck-Huber
(74) *Attorney, Agent, or Firm* — Oblon, McClelland, Maier & Neustadt, L.L.P.

(57) ABSTRACT

Aspects of the disclosure provide methods and apparatuses for video decoding. In some embodiments, an apparatus for video decoding includes processing circuitry. The processing circuitry decodes prediction information for a block in a current coded picture that is a part of a coded video sequence. The prediction information is indicative of a merge mode. Then, the processing circuitry constructs, in response to the merge mode, a candidate list of candidate motion vector predictors for the block. The candidate list includes one or more first candidates that are corner neighbors of the block. Then, the processing circuitry determines whether different parts of the block have different motion vector predictors. When it is determined that the different parts of the block have different motion vector predictors, the processing circuitry inserts at least one second merge candidate that is a side neighbor of the block into the merge candidate list and reconstructs the block according to the motion vector predictors in the merge candidate list.

18 Claims, 14 Drawing Sheets

(51) Int. Cl.
*H04N 19/115* (2014.01)
*H04N 19/44* (2014.01)
*H04N 19/52* (2014.01)
*H04N 19/119* (2014.01)

(52) U.S. Cl.
CPC ........... *H04N 19/176* (2014.11); *H04N 19/44* (2014.11); *H04N 19/52* (2014.11)

(58) Field of Classification Search
USPC .................................................... 375/240.16
See application file for complete search history.

(56) References Cited

U.S. PATENT DOCUMENTS

| | | | |
|---|---|---|---|
| 9,049,452 B2 | 6/2015 | Liu et al. | |
| 9,363,511 B2 | 6/2016 | Zhang et al. | |
| 9,510,012 B2 | 11/2016 | Liu et al. | |
| 9,621,888 B2* | 4/2017 | Jeon | H04N 19/52 |
| 9,769,472 B2 | 9/2017 | Liu et al. | |
| 9,813,726 B2 | 11/2017 | Liu et al. | |
| 2013/0077691 A1* | 3/2013 | Zheng | H04N 19/105 |
| | | | 375/240.16 |
| 2014/0092981 A1* | 4/2014 | Lin | H04N 19/52 |
| | | | 375/240.16 |
| 2014/0269926 A1* | 9/2014 | Oh | H04N 19/105 |
| | | | 375/240.16 |
| 2014/0355686 A1* | 12/2014 | Takehara | H04N 19/105 |
| | | | 375/240.16 |
| 2015/0085929 A1* | 3/2015 | Chen | H04N 19/597 |
| | | | 375/240.13 |
| 2015/0334411 A1* | 11/2015 | Yamamoto | H04N 19/513 |
| | | | 375/240.16 |
| 2017/0127082 A1* | 5/2017 | Chen | H04N 19/56 |
| 2017/0272745 A1 | 9/2017 | Liu et al. | |
| 2017/0353730 A1 | 12/2017 | Liu et al. | |
| 2018/0124398 A1* | 5/2018 | Park | H04N 19/105 |

OTHER PUBLICATIONS

High Efficiency Video Coding, Rec. ITU-T H.265 v4 Dec. 2016.
X. Zhang, et al, "Intra mode coding in HEVC standard", Visual Communications and Image Processing (VCIP), 2012 IEEE.
S. Liu; X. Zhang; S. Lei, "Rectangular partitioning for Intra prediction in HEVC", Visual Communications and Image Processing (VCIP), IEEE, Jan. 2012.
X. Zhang, et al, "Intra mode coding with fixed length binarization", Joint Collaborative Team on Video Coding (JCT-VC) of ITU-T SG16 WP3 and ISO/IEC JTC1/SC29/WG11, 8th Meeting, JCTVC-H0435, pp. 1-5.

* cited by examiner

METHOD AND APPARATUS FOR VIDEO CODING

INCORPORATION BY REFERENCE

This present disclosure claims the benefit of priority to U.S. Provisional Application No. 62/595,955, "METHODS FOR MOTION COMPENSATION IN VIDEO CODING" filed on Dec. 7, 2017, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding using inter-picture prediction with motion compensation has been known for decades. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between the original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from neighboring area's MVs. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be directed from metadata associated with one or more reference pictures, for example from the most recent (in decoding order) reference picture, using the MV associated with either one of five surrounding samples, denoted A0, A1, and B0, B1, B2 ((102) through (106), respectively). In H.265, the MV prediction can use predictors from the same reference picture that the neighboring block is using.

SUMMARY

Aspects of the disclosure provide methods and apparatuses for video decoding. In some embodiments, an apparatus for video decoding includes processing circuitry. The processing circuitry decodes prediction information for a block in a current coded picture that is a part of a coded video sequence. The prediction information is indicative of a merge mode. Then the processing circuitry constructs, in response to the merge mode, a merge candidate list of candidate motion vector predictors for the block. The merge candidate list includes one or more first merge candidates that are corner neighbors of the block. Then the processing circuitry determines whether different parts of the block have different motion vector predictors. When it is determined that the different parts of the block have different motion vector predictors, the processing circuitry inserts at least one second merge candidate that is a side neighbor of the block into the merge candidate list and reconstructs the block according to the motion vector predictors in the merge candidate list.

In some embodiments, to determine whether different parts of the block have different motion vector predictors, the processing circuitry determines whether the block meets a segmenting requirement. When it is determined that the block meets the segmenting requirement, the processing circuitry segments the block into virtual block segments so that each virtual block segment has at least one motion vector predictor. Then the processing circuitry compares the at least one motion vector predictor of each virtual block segment with the motion vector predictors of the block to select between a block-based merge mode or a segment-based merge mode. The block-based merge mode uses same motion vector predictor for all pixels of the block. The segment-based merge mode assigns different motion vector predictors to different parts of the block.

In some embodiments, the segmenting requirement can be a segmenting threshold for a size of the block. To determine whether the size of the block meets the segmenting threshold, in one example, the processing circuitry determines whether a column length of the block is larger than a first length threshold. In another example, the processing circuitry determines whether a row length of the block is larger than a second length threshold. In another example, the processing circuitry determines whether an aspect ratio of the block is out of an aspect ratio range.

In some embodiments, to segment the block into virtual block segments, the processing circuitry divides the block in half to generate intermediate virtual block segments. Then the processing circuitry recursively divides the intermediate virtual block segments in half until the size of the intermediate virtual block segments are below the segment threshold.

In some embodiments, to compare the at least one motion vector predictor of each virtual block segment with the motion vector predictors of the block to select a merge mode between a block-based merge mode or a segment-based merge mode, the processing circuitry selects reference pixels for each of the block and the segmented virtual block segments, respectively. Then, the processing circuitry selects reference blocks for each of the block and the segmented virtual block segments, respectively. Then, the processing circuitry compares the selected reference pixels with corresponding reference pixels near the selected reference blocks for each of the block and the segmented virtual block segments, respectively. A difference between the selected reference pixels and the corresponding reference pixels near the selected reference block is defined as a motion vector predictor for each of the block and the segmented virtual block segments. Finally, the processing circuitry selects a motion vector predictor having a lowest cost.

When it is determined that the different parts of the block have different motion vector predictors, the processing circuitry inserts at least one second merge candidate that is a side neighbor of the block into the merge candidate list. In one embodiment, the at least one second merge candidate has a same row number or a same column number as a corner neighbor of the block. In another embodiment, the at least one second merge candidate is a top side neighbor or a left side neighbor of the block.

In some embodiments, the processing circuitry can reduce a number of the merge candidates in the merge candidate list based on decoder side motion vector derivation methods.

In some embodiments, to reduce the number of the merge candidates in the merge candidate list, the processing circuitry sets up a reference cost for the decoder side motion vector derivation methods. Then the processing circuitry performs decoder side motion vector derivation methods on the merge candidates in the merge candidate list. Then the processing circuitry compares the costs of the merge candidates with the reference cost. Then the processing circuitry determines whether a difference between the cost of each merge candidate and the reference cost is higher than a cost threshold. When it is determined that the difference between the cost of a merge candidate and the reference cost is higher than the cost threshold, the processing circuitry removes the merge candidate from the merge candidate list.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
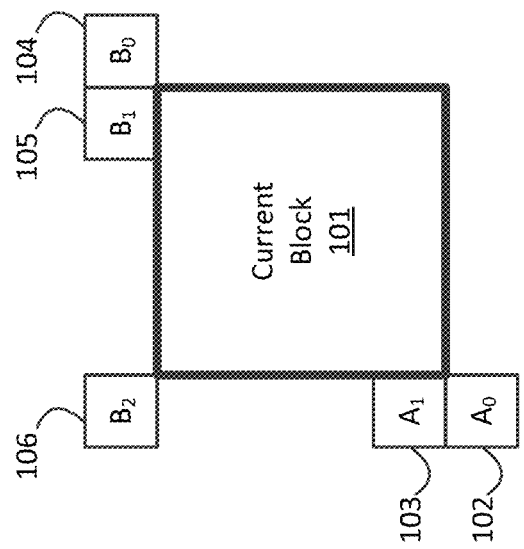
FIG. 1 is a schematic illustration of a current block and its surrounding spatial merge candidates in accordance with H.265.
Figure 2:
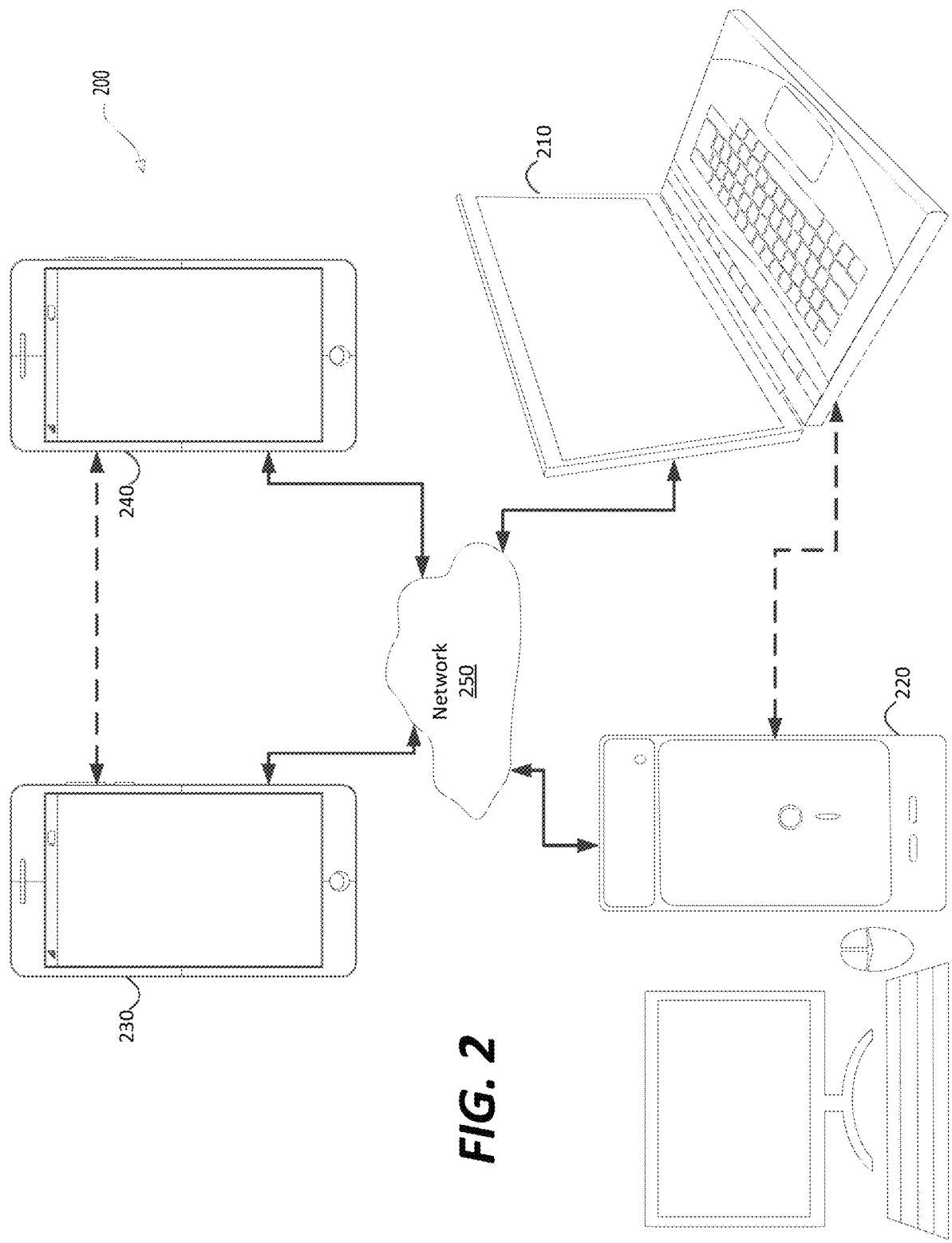
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
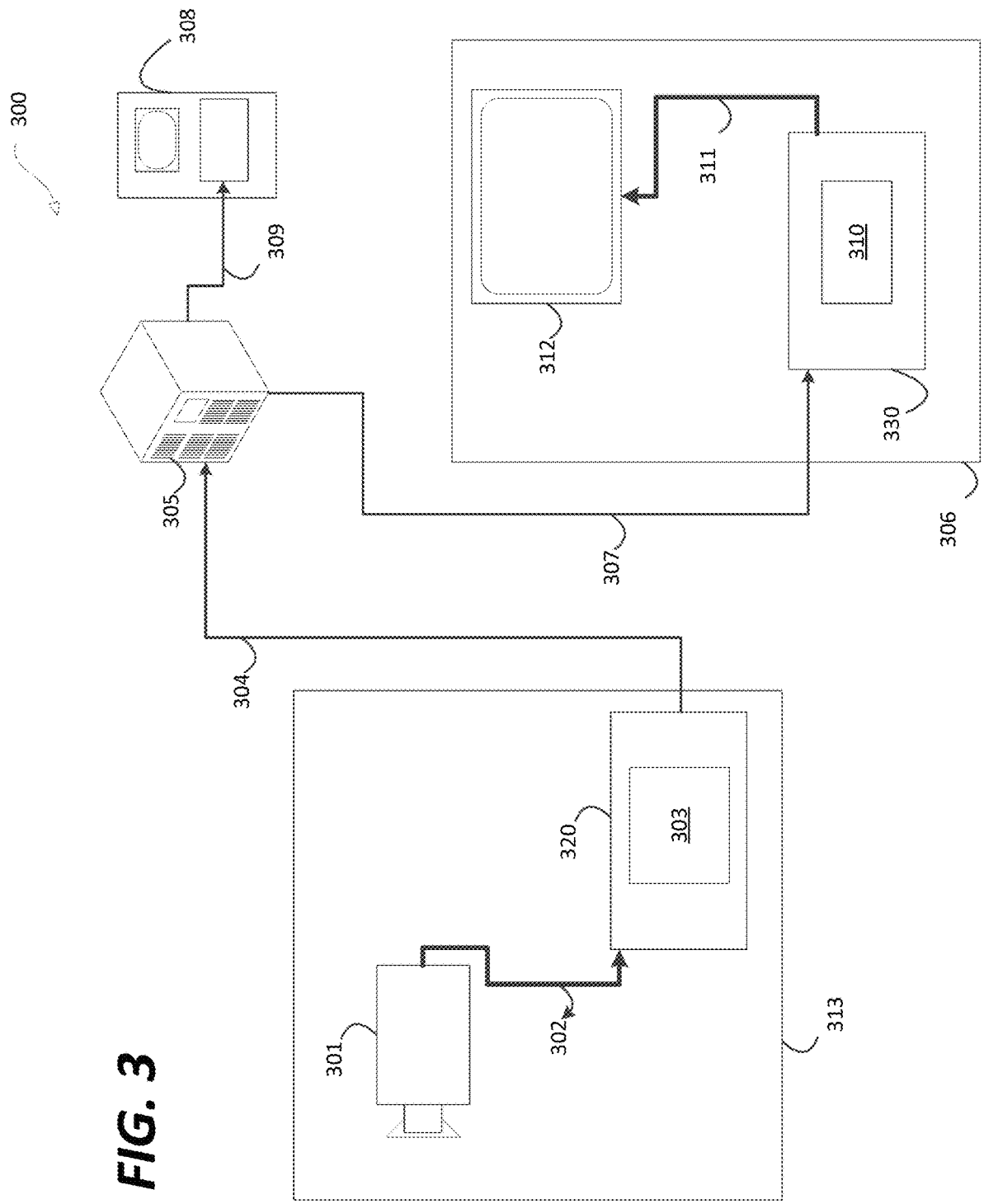
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), which can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
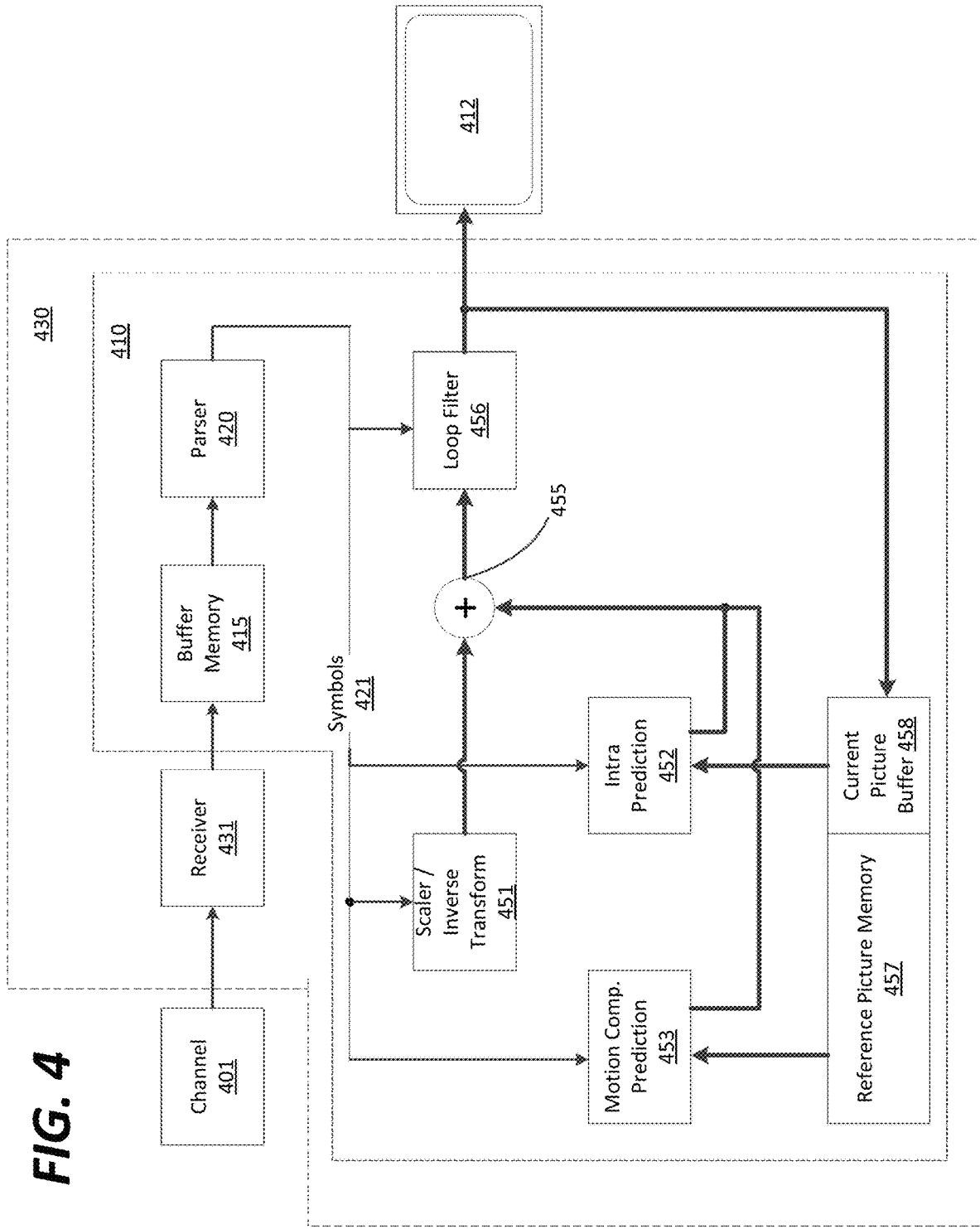
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence.

Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, and quantization scaling matrices, etc. as symbol (421) from the parser (420). The scaler/inverse transform unit (451) can output blocks comprising sample values, which can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstreams) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
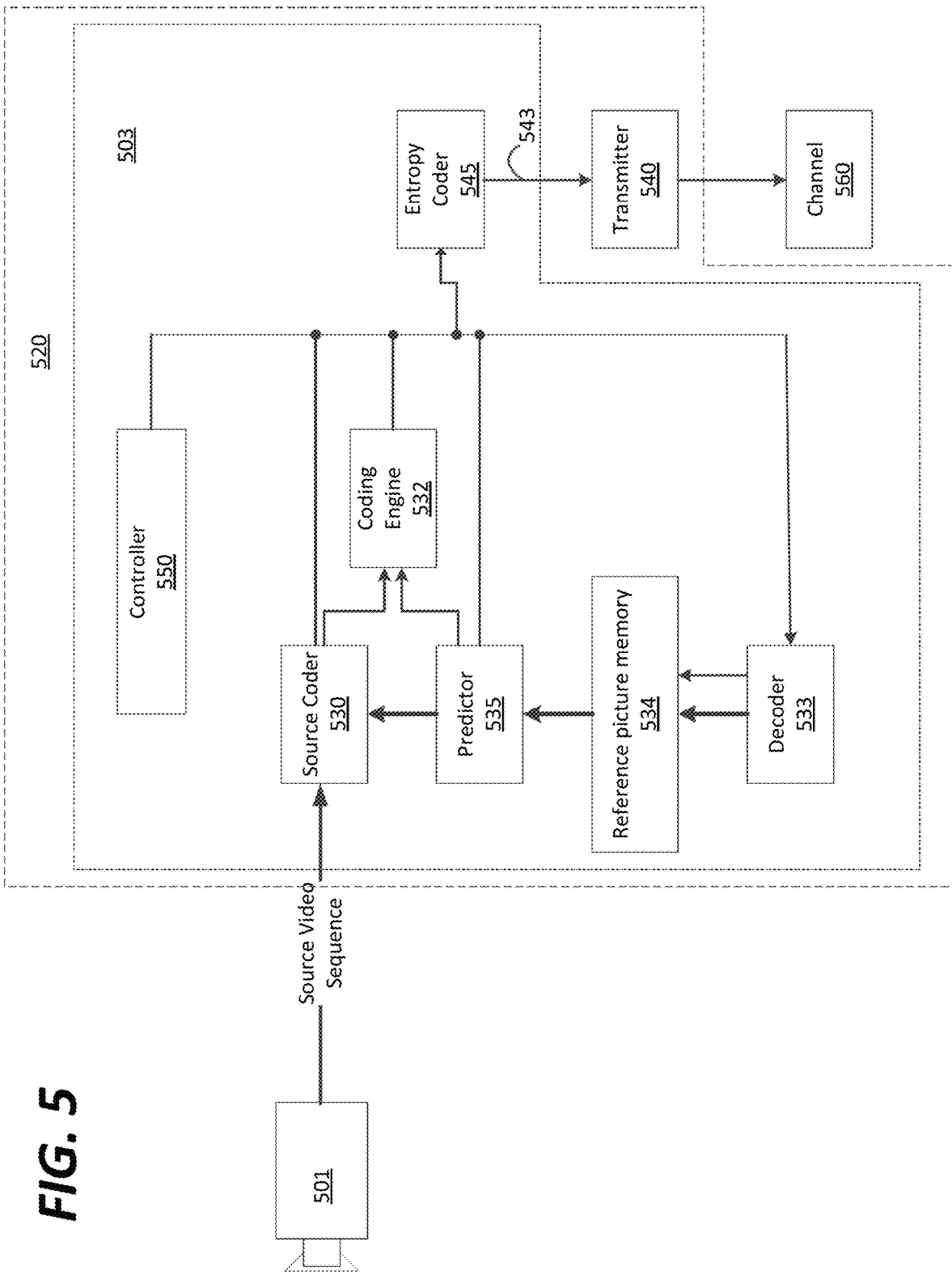
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstreams is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415) and the parser (420), may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I Picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive Picture (P Picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 6:
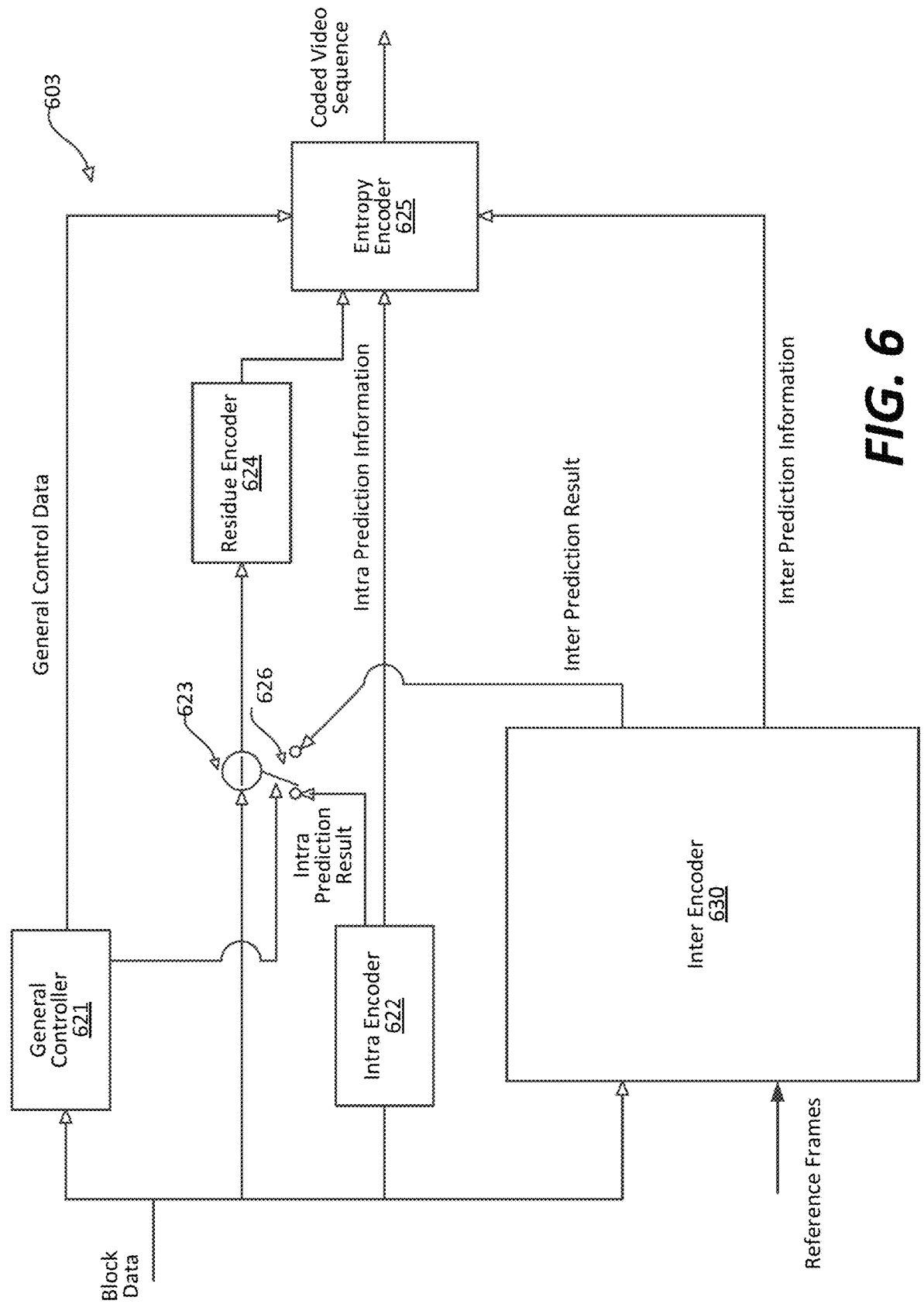
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction method where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621) and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques). In an example, the intra decoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra, the general controller (621) controls the switch (626) to select the intra mode result for use by the residue calculator (623), and controls the entropy encoder (625) to select the intra prediction information and include the intra prediction information in the bitstreams; and when the mode is the inter mode, the general controller (621) controls the switch (626) to select the inter prediction result for use by the residue calculator (623), and controls the entropy encoder (625) to select the inter prediction information and include the inter prediction information in the bitstreams.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data in the frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstreams to include the encoded block. The entropy encoder (625) is configured to include various information according to a suitable standard, such as HEVC standard. In an example, the entropy encoder (625) is configured to include the general control data, the selected prediction information (e.g., intra prediction information or inter prediction information), the residue information, and other suitable information in the bitstreams. Note that, according to the disclosed subject matter, when coding a block in the merge mode, there is no residue information.

Figure 7:
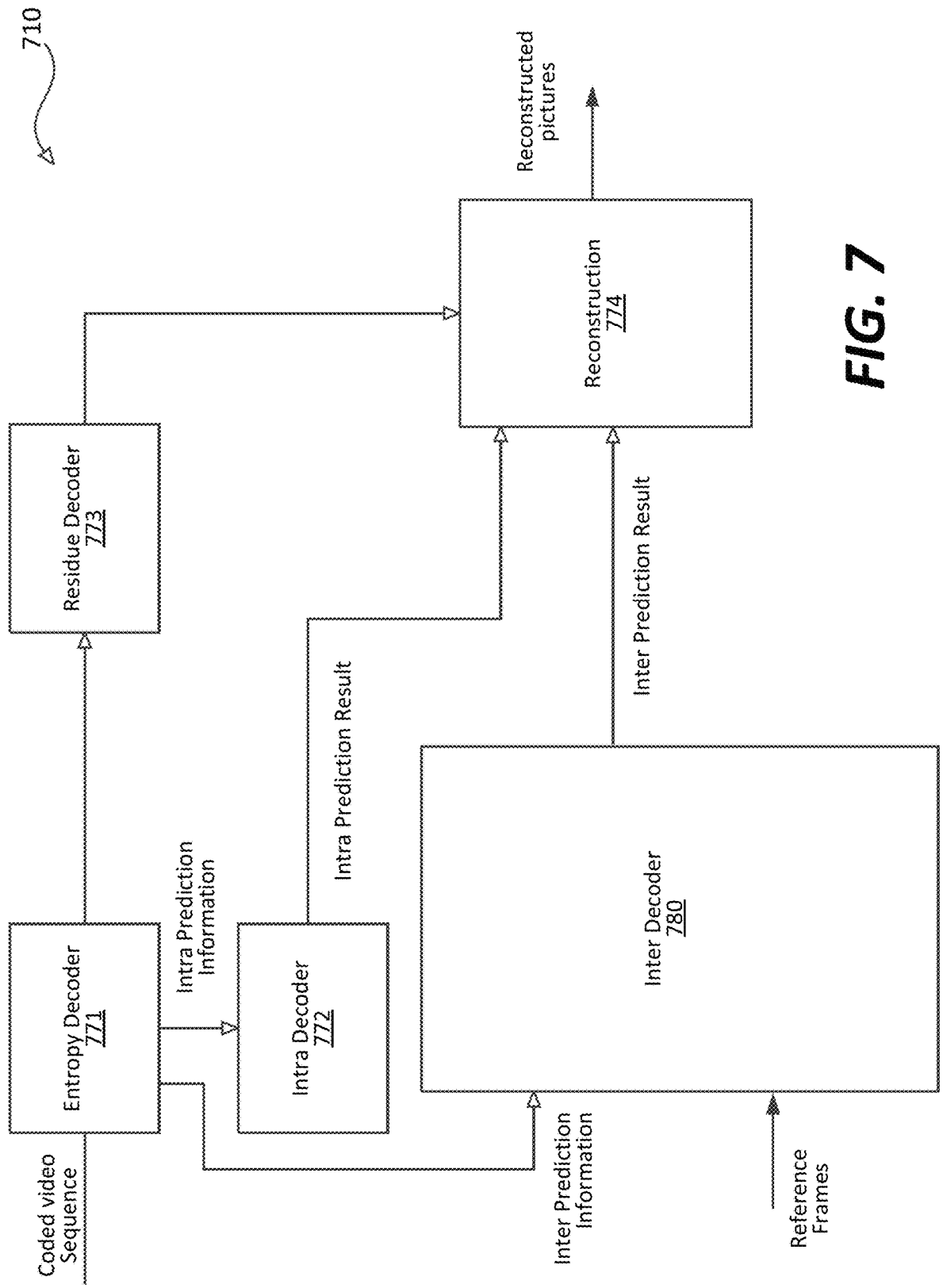
FIG. 7 shows a block diagram of a decoder in accordance with another embodiment.

FIG. 7 shows a diagram of a video decoder (710) according to another embodiment of the disclosure. The video decoder (710) is configured to receive a coded picture that is part of a coded video sequence, and decode the coded picture to generate a reconstructed picture. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as intra mode, inter mode, b-predicted mode), prediction information (such as intra prediction information or inter prediction information) that can identify certain sample or metadata that is used for prediction by the intra decoder (772) or the inter decoder (780) respectively, and residual information in the form of, for example, quantized transform coefficients and the like. In an example, when the prediction mode is inter or bi-predicted mode, the inter prediction information is provided to the inter decoder (780). In another example, when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter QP), and that information may be provided by the entropy decoder (771) (datapath not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503) and (603), and the video decoders (310), (410) and (710) can be implemented using any suitable technique. In an embodiment, the video encoders (303), (503) and (603), and the video decoders (310), (410) and (710) can be implemented using one or more integrated circuits. In another embodiment, the video encoders (303), (503) and (503), and the video decoders (310), (410) and (710) can be implemented using one or more processors that execute software instructions.

Figure 8:
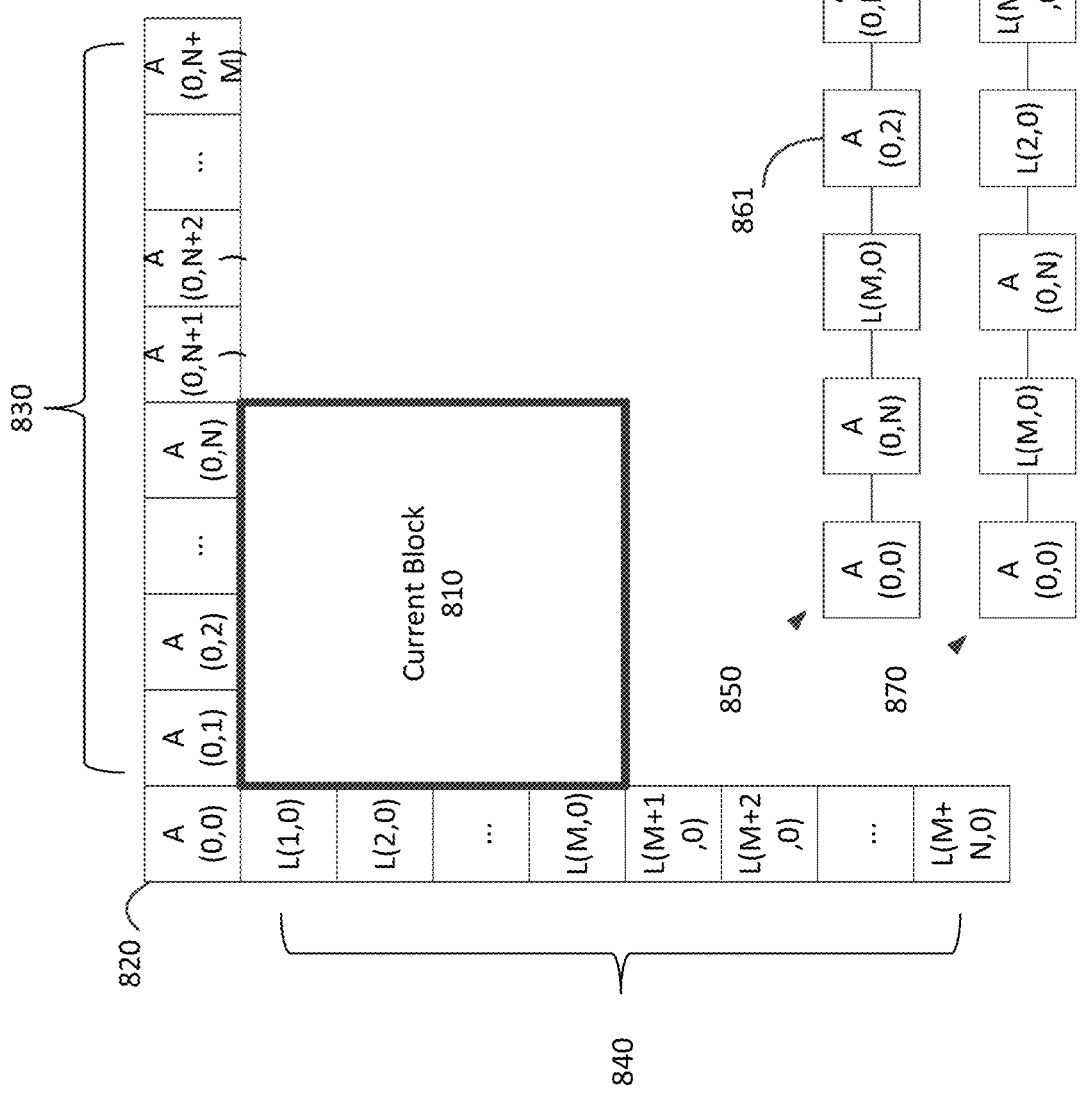
FIG. 8 is an exemplary schematic illustration of a motion vector prediction of a block and sub-blocks used for, or affected by, motion vector prediction.

Referring to FIG. 8, according to an aspect of the disclosure, merge mode can be a motion vector prediction method where the residual signal is not present in the bitstreams, and assumed to be zero for all coefficients including the DC coefficient. When a current block is under decoding using merge mode, the displacements of pixels in the current block may be derived from already decoded spatial/temporal neighboring blocks' motion information. Traditionally, motion compensation is performed at block level, that is, the current block is the processing unit for performing motion compensation using the same motion information predictor. Given the size of a block, all pixels in the block will use the same motion information predictor to form their prediction block. However, if the block can be virtually divided into more than one segment and each virtual block segment has its own motion information predictor, the motion information predictors for the entire block may not be the same. For example, the current block can be divided into halves. The first half virtual block segment uses a candidate from its own top-left neighboring block as if this half segment is an individual block itself; while the second half virtual block uses a candidate from its own top-left neighboring block as if this half segment is an individual block itself. Accordingly, each segment may have its own and different predictor. The encoder and decoder should either assume the same segmenting requirement and same selection of candidates for each virtual block segment so that no signaling is needed, or the selection of candidate's combination is signaled. In some embodiments, the segmenting requirement can be a size segmenting threshold. The following sections will describe several segmenting embodiments.

In an embodiment, a block under merge mode may include an array of smaller motion vector units. Each motion vector unit is referred to as a sub-block, which can be a K×L number of samples, where K and L are positive integer numbers. For example, when K and L are four (K=L=4), a sub-block includes 4×4 samples, and is referred to as a 4×4 sub-block. Each 4×4 sub-block in the current block may have a different motion vector (or motion vector pair when bi-prediction is used). In another example, when K and L are one (K=L=1), a sub-bock includes 1×1 sample, and is referred to as a 1×1 sub-block. Thus, each sample in the current block may have a different motion vector (or motion vector pair if bi-prediction is used).

In some embodiments, when sub-block level motion compensation is used, a candidate list (850) for the merge mode is constructed to include additional neighboring sub-blocks' motion information (e.g., candidate (861), candidate (862), and candidate (863)) that is added based on the sub-blocks in the current block. In an example, when constructing the candidate list for merge mode, spatial neighboring reference blocks' motion information is to be selected. In addition to the outer candidates on top of the current block at left and right corners (e.g., A(0, 0) and A(0, N+1) in FIG. 8) as in HEVC, certain additional motion information from top candidate positions may be selected into the candidate list based on the sub-blocks (e.g., spatial characteristics of sub-blocks) when certain conditions are met. For example, candidate list (850) includes additional candidates A(0, 2) (861) and A(0, N+M) (863). Similarly, in addition to the outer candidates to the left of current block at top and bottom corners (e.g., A(0, 0) and L(M+1, 0)) as in HEVC, certain additional motion information from left side candidate positions are selected into the candidate list based on the sub-blocks (e.g., spatial characteristics of the sub-blocks) when certain conditions are met. For example, candidate list (850) includes candidate L(2, 0) (862) and L(M+N, 0) (864). In the following paragraphs, a few aspects are disclosed to select such additional candidates for merge mode.

FIG. 8 shows a diagram of a current block (810) and surrounding neighboring sub-blocks (820), (830), and (840) that can be used as additional spatial candidates for the candidate list in the merge mode. In the FIG. 8 example, surrounding neighboring sub-blocks (820), (830), and (840) are 1×1 sub-blocks. The surrounding neighboring sub-block (820) (A(0, 0)) is a top-left sub-block of the current block (810). The surrounding neighboring sub-blocks (830) (A(0, 1)-A(0, N+M), N and M are positive integers) are the top sub-blocks of the current block (810). As an example, sub-block A(0, 2) can be inserted as a candidate in the candidate list, for example in position (861). The surrounding neighboring sub-blocks (840) (L(1, 0)-L(M+N, 0)) are the left sub-blocks of the current block (810). As an example, sub-block L(2, 0) can be inserted as a candidate in the candidate list, for example in position (862).

The order of candidates in the candidate list may have a direct influence on the coding efficiency of the video coding technology, as candidates towards the front of the candidate list may be represented by shorter codewords when comparing to candidates towards the end. In some embodiments, along the left side (or top side) of the current block (810), more of the surrounding neighboring sub-blocks (830) and (840) in the reference area may be selected as candidates and may be inserted in the candidate list (850) (or (870)), for example in positions (861), (862), (863), and (864), only when the size (e.g., the length) of the left side (or top side) of the current block (810) is of a sufficient and pre-determined length. The number of potential candidate positions in the reference area to be selected on one side of the block may be determined by the block size (e.g., length) of this side. As an example, a comparatively long length side may potentially have more surrounding neighboring sub-blocks from this side selected as candidates when comparing to a comparatively short length side. Doing so can limit the maximum length of the candidate list, which can have advantages from a computational complexity and memory consumption viewpoint.

The segmenting requirement can be a size segmenting requirement, for example, a size segmenting threshold. In one embodiment, a length threshold T is defined such that when the block length W is greater than T along the current block (810)'s top (or left) side, the block will be virtually divided into, for example, two smaller block segments along the top (or left) side, with equal size. It is noted that, in the context of the disclosed subject matter, the block segments are referred to as virtual block segments in some examples.

In the same or another embodiment, for each divided block segment, if the block length is still greater than the given threshold T, then a similar division operation can continue to divide each block segment into even smaller block segments by a predetermined factor, for example by halves, until in each block segment the length is no longer greater than T. The length threshold can be any integer number. In particular, the length threshold can advantageously be set as a power of 2. In some examples, a first length threshold is defined for the top side and a second length threshold is defined for the left side.

In a specific example, when the first length threshold T is defined to be 32 (e.g., in the units of pixels), and the block length of the top side (width W) of the current block (810) is 128 (e.g., in the units of pixels). The block will be divided into left and right halves of equal size, each of the block segments will have a top length of 64 (e.g., in the units of pixels). In this example, at 1 level of horizontal splitting, the block with length of 128 on top is divided into 2 (virtual) block segments, each with 64 (e.g., in the units of pixels) in length on top. Optionally, each of these two block segments will be further divided by left and right halves of equal size, having its block length on top as 32. In this example, up to 2 levels of horizontal splitting is performed such that the block with length of 128 on top is divided into 4 virtual block segments, each with 32 in length on top.

It is noted that when both sides of the block are long enough (W and H are both greater than T), in one embodiment, both sides of the block may be segmented; in another embodiment, only one side of the block may be segmented instead of both sides. If only one side of the block is segmented, in one example, the longer side of the block may be divided. If the current block is a square, in one example, the top side of the block may be divided.

Further, according to an aspect of the disclosure, the surrounding neighboring sub-blocks (830) and (840) are selectively added in the candidate list according to spatial relationship with the block segments. In some examples, for each divided block segment, a top/left spatial candidate of its own should be added into the candidate list for the whole block.

Figure 9:
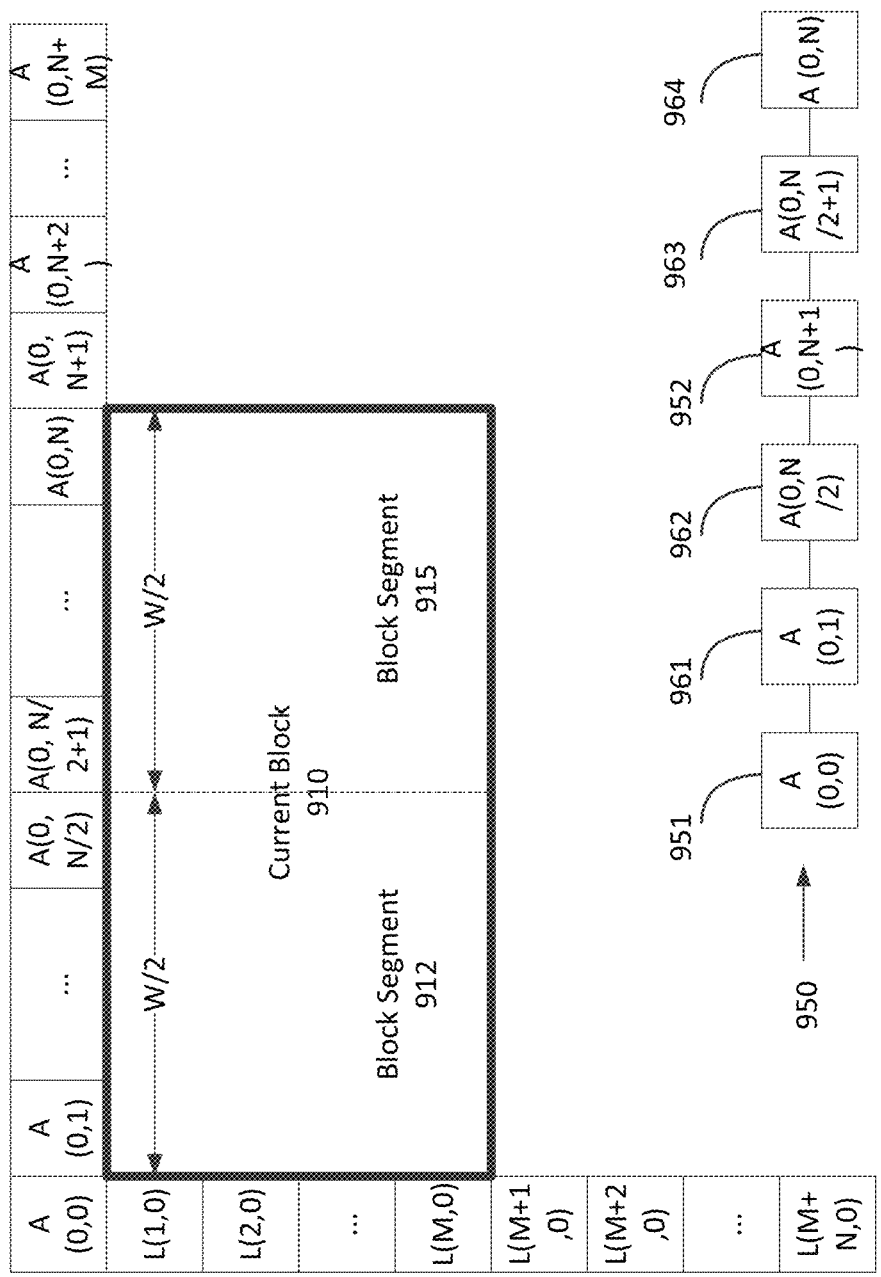
FIG. 9 is an exemplary schematic illustration of vertical motion vector prediction with uniform and square sub-block dimensions.

FIG. 9 shows an example that selectively inserts surrounding neighboring sub-blocks in the candidate list (950) based on the spatial relationship to the block segments, such as candidate list position (961), (962), (963), and (964). In the FIG. 9 example, it is assumed that the width (block length) W of a current block (910) is twice of the length threshold T. In this example, the current block (910) will be divided into two horizontal block segments (912) and (915), each with length W/2=T. In an example, the surrounding neighboring sub-blocks A(0, 0) and A(0, N+1) are candidates for the whole current block (910) and are added into the candidate list (950) (e.g., indicators that are indicative of the surrounding neighboring sub-blocks A(0, 0) (951) and A(0, N+1) (952) are added into the candidate list (950). In addition to the candidates A(0,0) and A(0, N+1), other candidates may be added into the candidate list. In an example, A(0, 1) and A(0, N/2) are considered as the top left and top right neighbors of the left half block segment (912), and may be inserted into the candidate list (e.g., indicators that are indicative of the surrounding neighboring sub-blocks A(0, 1) and A(0, N/2) are added into the candidate list (950) for example at positions (961) and (962)). In another example, A(0, N/2+1) and A(0, N) are considered as the top left and top right neighbors of the divided right half block segment (915), and may be inserted into the candidate list (950) (e.g., indicators that are indicative of the surrounding neighboring sub-blocks A(0, N/2+1) and A(0, N) are added into the candidate list (950) for examples at positions (963) and (964)).

Figure 10:
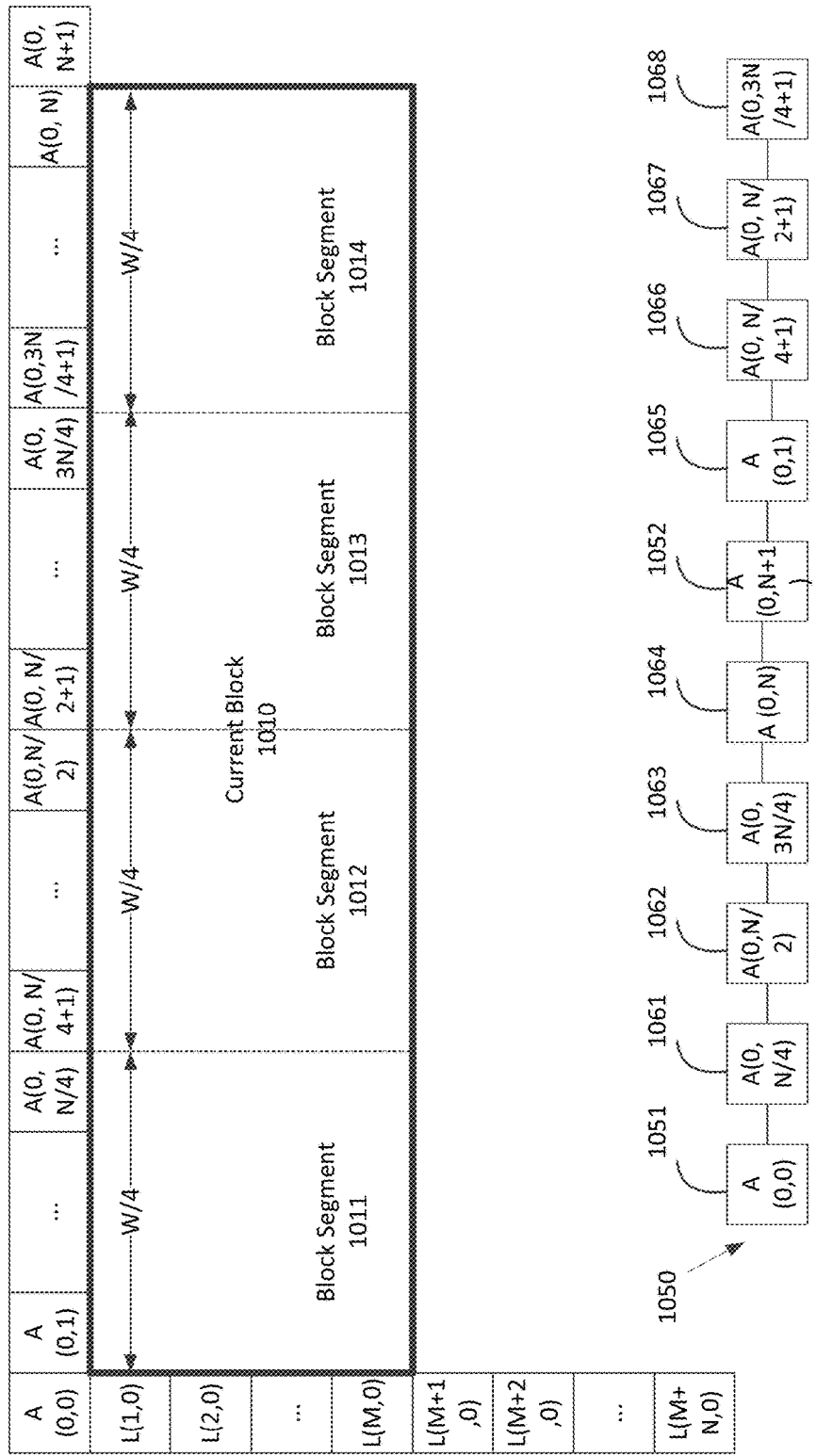
FIG. 10 is an exemplary schematic illustration of vertical motion vector prediction with rectangular and non-uniform sub-block sizes.

FIG. 10 shows another example that selectively inserts surrounding neighboring sub-blocks in the candidate list (1050) based on the spatial relationship to the block segments. In the FIG. 10 example, it is assumed that the width (block length) W of a current block (1010) is four times of the length threshold T. Still assuming a subdivision by a power of 2, the current block (1010) will be divided into four horizontal block segments (1011)-(1014), each with length W/4=T. In an example, the surrounding neighboring sub-blocks A(0, 0) and A(0, N+1) are candidates for the whole current block (1010) and are added into the candidate list (1050) (e.g., indicators that are indicative of the surrounding neighboring sub-blocks A(0, 0) and A(0, N+1) are added into the candidate list (1050) at positions (1051) and (1052)). In addition to the candidates A(0, 0) and A(0, N+1), other candidates are added into the candidate list (1050). In an example, A(0, N/4), A(0, N/2), A(0, 3N/4), and A(0, N) are inserted into the candidate list (1050) at positions (1061), (1062), (1063), and (1064). In another example, A(0, 1), A(0, N/4+1), A(0, N/2+1), and A(0, 3N/4+1) are inserted into the candidate list (1050) at positions (1065), (1066), (1067), and (1068). The above is just a discussion of top reference candidates, as an example, similar methods apply to the block height of the current block if the block height is taller than a given threshold.

It is noted that in an example, when the length of the top/left side is shorter than T, no additional candidate will be selected.

In some embodiments, the division of a block into block segments can be triggered by an aspect ratio of the block. For example, when the aspect ratio is out of an aspect ratio range (e.g., higher than an upper boundary of the aspect ratio range or lower than a lower boundary of the aspect ratio range), the longer side of the block is divided for example into halves. In one embodiment, the aspect ratio range is from ½ to 2. In another embodiment, the aspect ratio range is ¼ to 4.

In the above description, when a block is divided into virtual block segments, each segment can have its own motion vector predictor, thus this merge mode is referred to as segment-based merge mode, while the traditional method in which all pixels in the block use the same motion vector predictor is referred to as block-based merge mode. Whether to choose segment-based merge mode or block-based merge mode can be determined by using decoder side motion vector derivation methods.

In one embodiment, a few candidates are selected out from a large candidate pool using decoder side motion vector derivation methods and then a final chosen one is signaled. The selection of the candidates can be performed by using candidate reduction techniques which will be described in greater detail later.

In another embodiment, several possible merge candidate positions' compensation costs are checked using either segment-based merge mode or block-based merge mode. Then a merge mode with a lower cost is chosen to avoid sending increased overhead information due to increased number of oval candidates.

Figure 11:
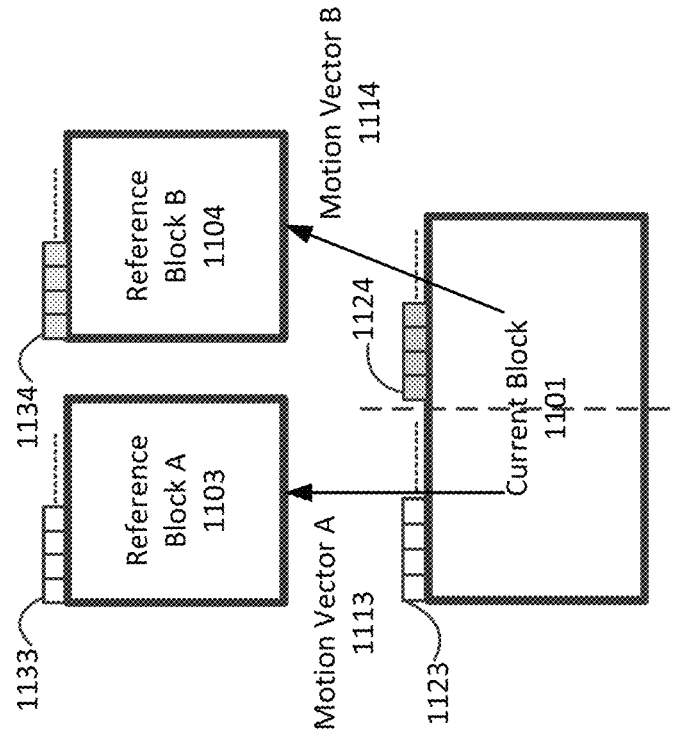
FIG. 11 is an exemplary schematic illustration of template cost comparison between block-based merge mode and segment-based merge mode.
Figure 11:
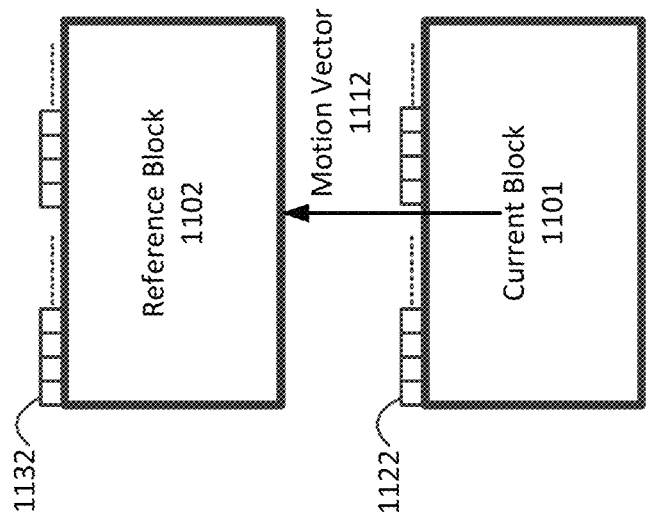

FIG. 11 is an exemplary schematic illustration of template cost comparison between block-based merge mode and segment-based merge mode. As shown in the FIG. 11 example, a few pixels (4 in the figure example) from the top left corner of each virtual block segment for a current block (1101) are used for evaluating the template costs by using one motion vector for the whole block (left hand side) or using one motion vector for each block segment (right hand side). When multiple motion vectors are used, the reference pixels near the current block are to be compared with different reference blocks' neighboring pixels.

In segment-based merge mode, the current block (1101) is divided into two halves as shown in the right hand side of FIG. 11, a reference block A (1103) is the reference block of the left half virtual segment of the current block (1101), while a reference block (1104) is the reference block of the right half virtual segment of the current block (1101). Accordingly, reference pixels (1123) near left half of the current block (1101) are to be compared with the corresponding reference pixels (1133) near the reference block A (1103), as indicated by a motion vector A (1113), while reference pixels (1124) near right half of the current block (1101) are to be compared with the corresponding reference pixels (1134) near the reference block B (1104), as indicated by a motion vector B (1114).

In addition, as shown in the left side of FIG. 11, in block-based merge mode, reference pixels (1122) near right half of the current block (1101) are to be compared with the corresponding reference pixels (1132) near a reference block B (1102), as indicated by a motion vector (1112). Then a template cost comparison between segment-based merge mode and block-based merge mode can be performed, and then a merge mode with a lower cost will be selected.

In one embodiment, the template cost comparison may be to select the lowest cost among the motion vector (1112), the motion vector A (1113), and the motion vector B (1114). If the cost of the motion vector (1112) is lowest among the three motion vectors, block-based merge mode will be selected; however, if the cost of the motion vector A (1113) or the cost of the motion vector B (1114) is lowest among the three motion vectors, segment-based merge mode will be selected.

In other embodiments, various weight combinations between the template cost of the motion vector A (1113) and the template cost of the motion vector B (1114) can be taken first and referred to as template cost of the segment-based merge mode. Then the template cost of the segment-based merge mode can be compared with that of the block-based merge mode, and a merge mode with a lower cost will be selected.

It is noted that a different number of reference pixels (for example, 8 pixels instead of 4), as well as different locations of these reference pixels (for example, top left and top right corners of current block segment are both considered, instead of only using top left corner), can be chosen for evaluation.

Aspects of the disclosure also provide some special merge modes for virtual block segments.

In one embodiment, a vertical merge mode is defined as, the current block is divided into several horizontally side by side segments (side by side from left to right), each of which will choose its own top neighbor's motion information as a predictor. The definition of top neighbor for all segments is the same so no extra index is needed for the selection. For example, if the current block (810) in the FIG. 8 example is segmented in the vertical merge mode, the top left pixel's top position A(0, 1) is defined for each segment.

In another embodiment, a horizontal merge mode is defined as, the current block is divided into several vertically side-by-side segments (side by-side from top to bottom), each of which will choose its own left neighbor's motion information as a predictor. The definition of left neighbor for all segments is the same so no extra index is needed for the selection. For example, if the current block (810) in the FIG. 8 example is segmented in horizontal merge mode, the top left pixel's left position L(1, 0) is defined for each segment.

It is noted that the orders of candidates in the list may be changed in all of the above embodiments.

Aspects of the disclosure also provide techniques for reducing merge candidate list.

In one embodiment, a reference cost is set up for the costs of decoder side motion vector derivation methods. In one example, the cost of a most likely motion vector, such as a zero motion vector, or the top-left sub-block's motion vector, is considered as a reference cost. In another example, a reference cost can be signaled in slice header. The decoder side motion vector derivation methods are performed on different merge candidates and their costs are to be compared with the reference cost. Then it is determined that whether a difference between the cost of a merge candidate and the reference cost is higher than a cost threshold. If it is determined that the difference between the cost of the merge candidate and the reference cost is higher than the cost threshold, the merge candidate will not be included in a final merge candidate list.

In another embodiment, the candidates from block-based merge mode and segment-based merge mode can be received by a decoder as a pair. At the decoder side, after parsing the merge index, one pair of such candidates is selected. Then decoder side motion vector derivation methods can be used to choose a better one of the two candidates and set the better candidate as a final predictor.

Figure 12:
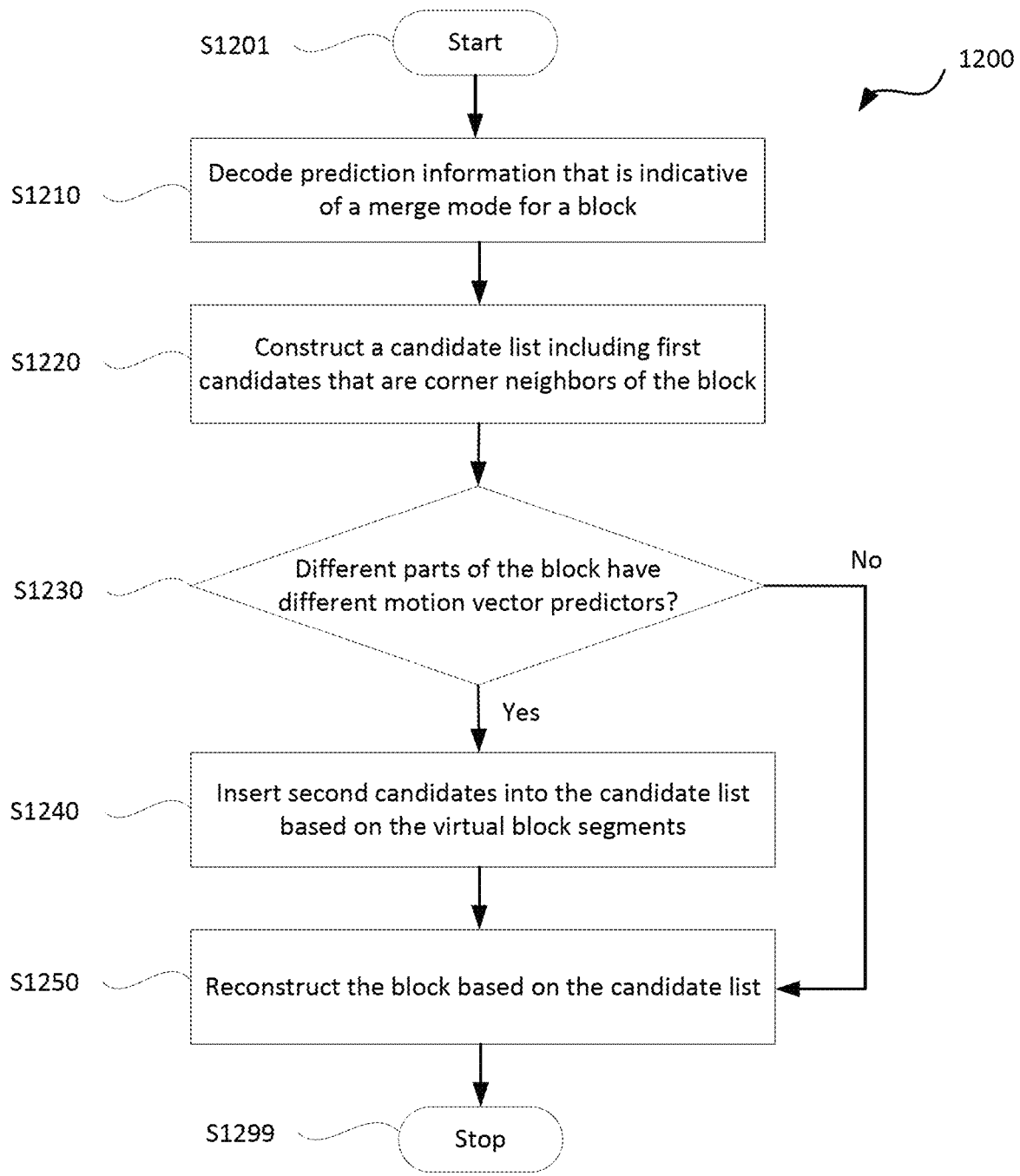
FIG. 12 shows a flow chart outlining a process (1200) according to some embodiments of the disclosure.

FIG. 12 shows a flow chart outlining a process (1200) according to embodiments of the disclosure. The process (1200) can be used in the reconstruction of a block coded in inter predication and merge mode, so to generate a prediction block for the block under reconstruction. During the process (1200), a candidate list may be generated with candidates that are added based on certain characteristics of the block, including, for example, size characteristics. In various embodiments, the process (1200) are executed by a processing circuitry, such as the processing circuitry in the terminal devices (210), (220), (230), and (240), the processing circuitry that performs functions of the video encoder (303), the processing circuitry that performs functions of the video decoder (310), the processing circuitry that performs functions of the video decoder (410), the processing circuitry that performs functions of the motion compensation prediction module (453), the processing circuitry that performs functions of the video encoder (503), the processing circuitry that performs functions of the predictor (535), the processing circuitry that performs functions of the inter encoder (630), the processing circuitry that performs functions of the inter decoder (780), and the like. In some embodiments, the process (1200) is implemented in software instructions, thus when the processing circuitry executes the software instructions, the processing circuitry performs the process (1200).

The process starts at (S1201) and proceeds to (S1210). At (S1210), the process (1200) decodes prediction information for a block in a current coded picture that is a part of a coded video sequence. For example, the processing circuitry decodes the prediction information, and determines that the prediction information is indicative of a merge mode. After the prediction information is decoded, the process (1200) proceeds to (S1220).

At (S1220), the process (1200) constructs a candidate list that includes first candidates that are corner neighbors of the block. In an example, the processing circuitry constructs a candidate list that initially includes first candidates that are corner neighbors of the block. In some examples, a corner neighbor is a neighbor to the corners of the block, such as A(0, 0), L(M+1, 0), A(0, N+1), L(M, 0), and A(0, N) in the FIG. 8 example. In the following steps, the processing circuitry will insert one or more second candidates that are side neighbors based on certain characteristics of the block, such as size characteristics. In some examples, a side neighbor is a neighbor to the top side or left side of the block, such as A(0,1)-A(0,N−1), A(0,N+2)-A(0,N+M), L(1, 0)-L(M−1,0), and L(M+2,0)-L(M+N) in the FIG. 8 example. After the candidate list is constructed, the process (1200) proceeds to (S1230).

At (S1230), the process (1200) determines whether different parts of the block have different motion vector predictors. In some embodiments, to determine whether different parts of the block have different motion vector predictors, the processing circuitry determines whether the block meets a segmenting requirement. When it is determined that the block meets the segmenting requirement, the processing circuitry segments the block into virtual block segments so that each virtual block segment has at least one motion vector predictor. Then the processing circuitry compares the at least one motion vector predictor of each virtual block segment with the motion vector predictors of the block to select a merge mode between a block-based merge mode or a segment-based merge mode. The block-based merge mode uses same motion vector predictor for all pixels of the block. The segment-based merge mode assigns different motion vector predictors to different parts of the block. When it is determined that different parts of the block have different motion vector predictors, the process (1200) proceeds to (S1240); otherwise, the process (1200) proceeds to (S1250).

At (S1240), the process (1200) inserts the at least one motion vector of each virtual block segment, herein referred to as second candidate, into the merge candidate list. In one example, the second candidate has a same row number or a same column number as a corner neighbor of the block. In another example, the second candidate is a top side neighbor or a left side neighbor of the block. After the second candidates are inserted into the merge candidate list, the process proceeds to (S1250).

At (S1250), the process (1200) reconstructs the block based on the motion vector predictors in the candidate list. Then the process (1200) proceeds to (S1299) and terminates.

Figure 13:
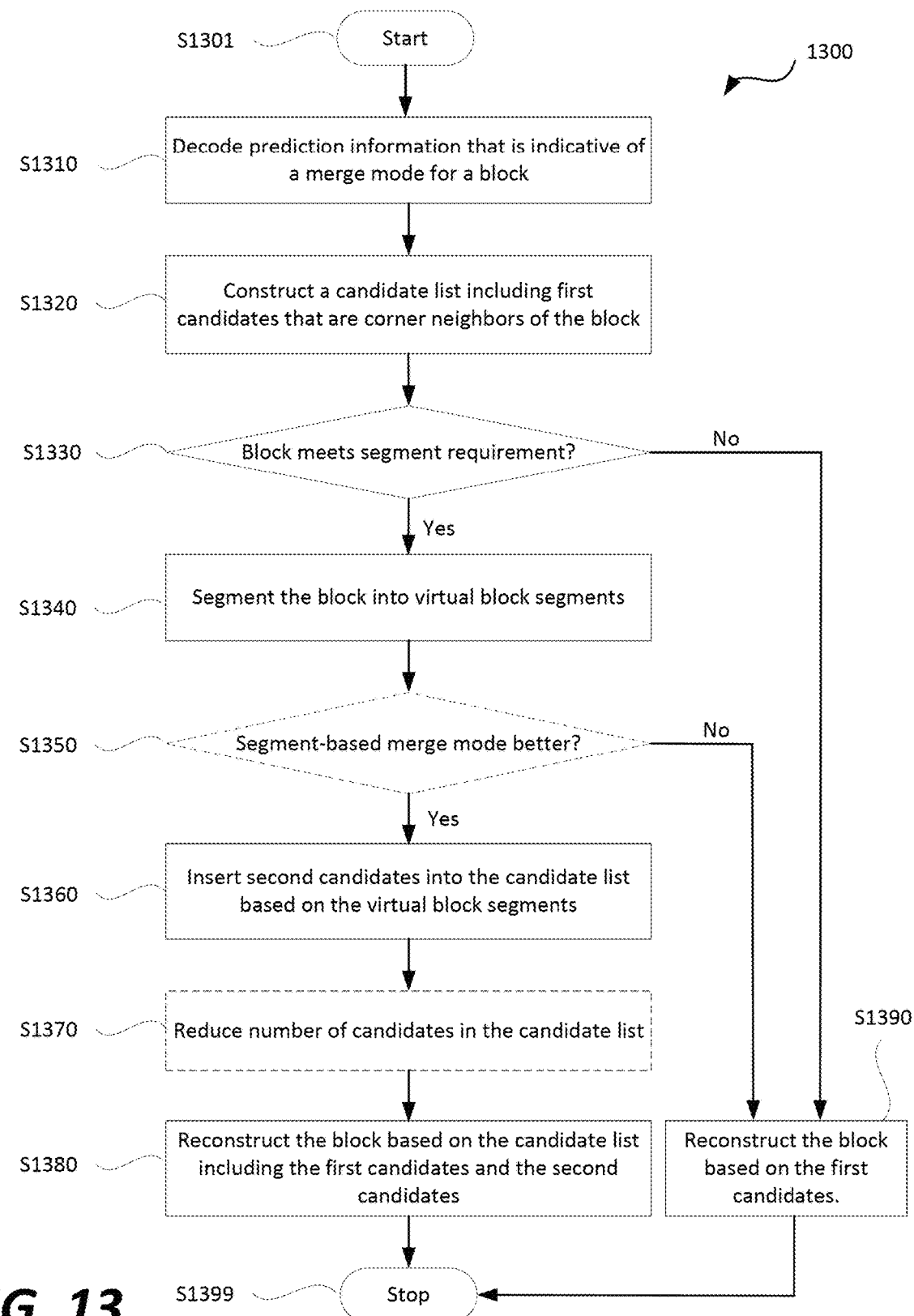
FIG. 13 shows a flow chart outlining a process (1300) according to some embodiments of the disclosure.

FIG. 13 shows a flow chart outlining a process (1300) according to some embodiments of the disclosure. The process (1300) can be used in the reconstruction of a block coded in inter mode and merge mode, so to generate a prediction block for the block under reconstruction. During the process (1300), a candidate list may be generated with candidates that are added based on certain characteristics of the block, including, for example, size characteristics. In various embodiments, the process (1300) are executed by a processing circuitry, such as the processing circuitry in the terminal devices (210), (220), (230), and (240), the processing circuitry that performs functions of the video encoder (303), the processing circuitry that performs functions of the video decoder (310), the processing circuitry that performs functions of the video decoder (410), the processing circuitry that performs functions of the motion compensation prediction module (453), the processing circuitry that performs functions of the video encoder (503), the processing circuitry that performs functions of the predictor (535), the processing circuitry that performs functions of the inter encoder (630), the processing circuitry that performs functions of the inter decoder (780), and the like. In some embodiments, the process (1300) is implemented in software instructions, thus when the processing circuitry executes the software instructions, the processing circuitry performs the process (1300).

The process starts at (S1301) and proceeds to (S1310). At (S1310), the process (1300) decodes prediction information for a block in a current coded picture that is a part of a coded video sequence. For example, the processing circuitry decodes the prediction information, and determines that the prediction information is indicative of a merge mode. After the prediction information is decoded, the process (1300) proceeds to (S1320).

At (S1320), the process (1300) constructs a candidate list that includes first candidates that are corner neighbors of the block. In an example, the processing circuitry constructs a candidate list that initially includes first candidates that are corner neighbors of the block. In some examples, a corner neighbor is a neighbor to the corners of the block, such as A(0, 0), L(M+1, 0), A(0, N+1), L(M, 0), and A(0, N) in the FIG. 8 example. In the following steps, the processing circuitry will insert one or more second candidates that are the side neighbors based on certain characteristics of the block, such as size characteristics. In some examples, a side neighbor is a neighbor to the top side or left side of the block, such as A(0,1)-A(0,N−1), A(0,N+2)-A(0,N+M), L(1, 0)-L(M−1,0), and L(M+2,0)-L(M+N) in the FIG. 8 example. After the candidate list is constructed, the process (1300) proceeds to (S1330).

At (S1330), the process determines whether the block meets a segmenting requirement. In some embodiments, the segmenting requirement can be a size segmenting threshold. In one example, the processing circuitry can determine whether a width (e.g., the number of columns of pixels in the block) or a height (e.g., the number of rows of pixels in the block) is larger than the size segmenting threshold. When the block meets the segmenting requirement, the process (1300) proceeds to (S1340); otherwise, the process (1300) proceeds to (S1390).

At (S1340), the process divides the block into virtual block segments so that each virtual block segment has at least one motion vector predictor. The merge mode in which different parts of the block have different motion vector predictors is referred to as segment-based merge mode. The additional one or more candidates generated in the segment-based merge mode are referred to as second merge candidates. In one example, each of the second merge candidates has a same row number or a same column number as a corner neighbor of the block as described with reference to FIG. 9 and FIG. 10. In another example, each of the second merge candidates is a top side neighbor or a left side neighbor of the block. In addition, the merge mode in which all pixels of the block use same motion vector is referred to as block-based merge mode. In segment-based merge mode, the block can be optionally recursively divided in half until the segmenting requirement is no longer met. After the virtual block segments are generated, the process (1300) proceeds to (S1350).

At (S1350), the process (1300) determines whether the segment-based merge mode is better than the block-based merge mode. In one embodiment, the processing circuitry can determine whether the cost of the block-based merge mode is higher than that of the segment-based merge mode, such as described with reference to FIG. 11. When the cost of the block-based merge mode is determined to be higher than that of the segment-based merge mode, the process proceeds to (S1360); otherwise, the process proceeds to (S1390).

At (S1360), the process (1300) inserts the second merge candidates into the merge candidate list. The second merge candidates are generated based on the virtual block segments. After the second merge candidates are inserted in the merge candidate list, the process (1300) proceeds to (S1370).

At (S1370), the process (1300) reduces a number of the merge candidates in the merge candidate list. The redundant candidates or the candidates with high cost in the merge candidate list can be excluded based on decoder side motion vector derivation methods. It is noted that this step can be skipped in some embodiments. Then the process (1300) proceeds to (S1380)

At (S1380), the process (1300) reconstructs the block according to the merge candidate list that includes the first candidates and the second candidates. Then the process (1300) proceeds to (S1399) and terminates.

In some embodiments, the process (1300) proceeds to (S1390). At (S1390), the process (1300) reconstructs the block based on the first candidates in the merge candidate list. Then the process (1300) proceeds to (S1399) and terminates.

In one embodiment, (S1350) can be skipped and the process (1300) can directly proceed to (S1360) after finishing (S1340). In such a case, the comparison between the block-based merge mode and the segment-based merge mode is not performed. In one example, a few candidates are selected from the candidate list using decoder side motion vector derivation methods, and then the final chosen one is signaled. In another example, the candidates of the block-based merge mode and the segment-based merge mode can be received by a decoder in pair and the decoder can select one pair of such candidates and use decoder side motion vector derivation methods to choose a final predictor.

In the same or another embodiment, (S1370) can be skipped and the process (1300) can directly proceed to (S1380) after finishing (1360). In such a case, the candidate list reduction is not needed. In one example, a final predictor can be selected from the large candidate list according to a merge index. Then the block can be reconstructed based on the selected final predictor.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
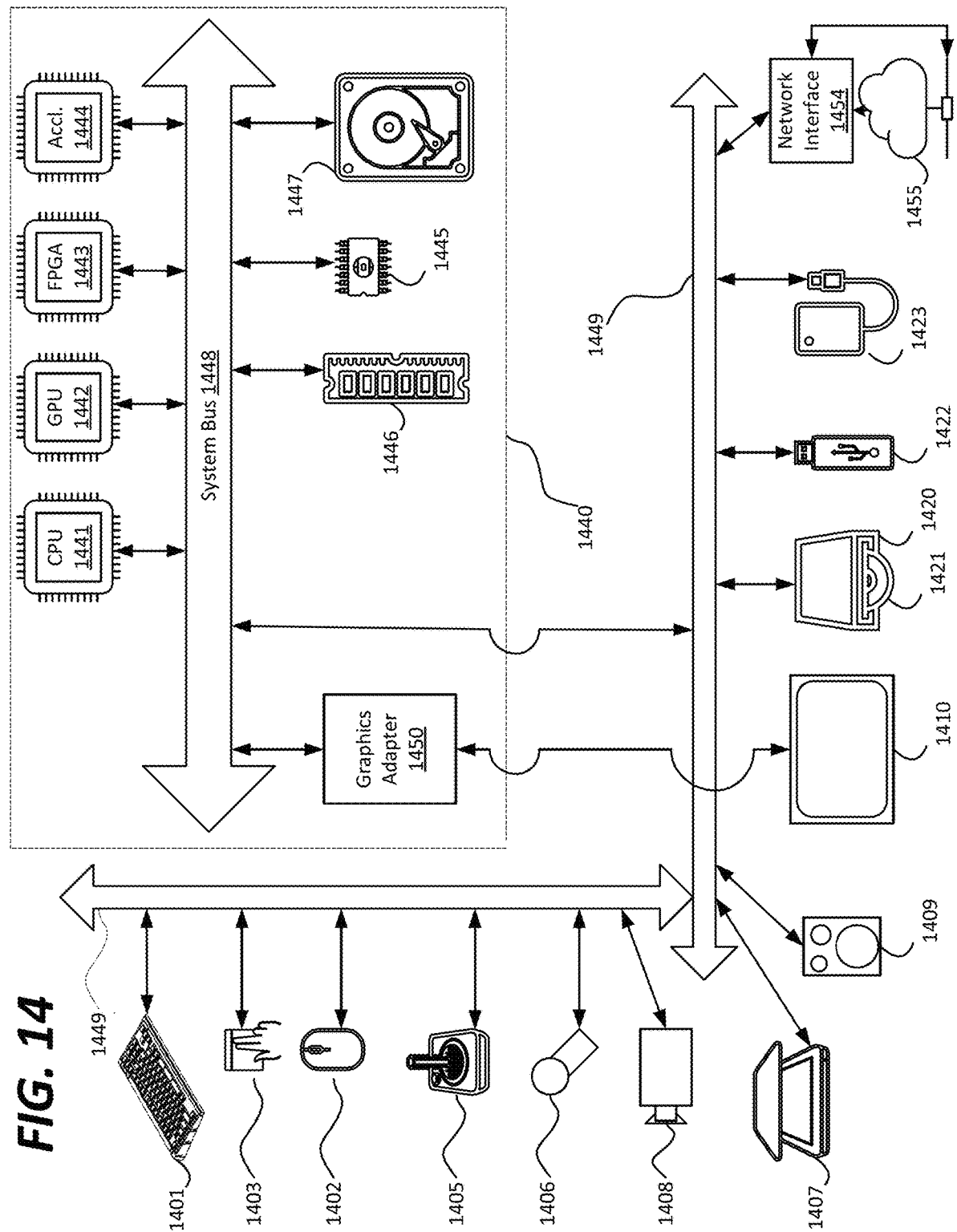
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), and camera (1408), etc.

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be unidirectional, receive only (for example, broadcast TV), unidirectional send-only (for example CAN bus to certain CAN bus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory RAM: Random Access Memory
ASIC: Application-Specific Integrated Circuit
PLD: Programmable Logic Device
LAN: Local Area Network
GSM: Global System for Mobile communications
LTE: Long-Term Evolution
CAN Bus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   decoding prediction information for a block in a current coded picture that is a part of a coded video sequence, the prediction information being indicative of a merge mode;
   constructing, in response to the merge mode, a merge candidate list of candidate motion vector predictors for the block, the merge candidate list including one or more first merge candidates that are corner neighbors of the block;
   determining whether different parts of the block have different motion vector predictors;
   inserting at least one second merge candidate that is a side neighbor of the block into the merge candidate list, when different parts of the block are determined to have different motion vector predictors; and
   reconstructing the block according to the motion vector predictors in the merge candidate list, wherein
   the determining whether different parts of the block have different motion vector predictors includes
      determining whether the block meets a segmenting requirement,
      segmenting the block into virtual block segments so that each virtual block segment has at least one motion vector predictor, when the block is determined to meet the segmenting requirement, and
      comparing the at least one motion vector predictor of each virtual block segment with the motion vector predictors of the block to select between a block-based merge mode or a segment-based merge mode.

2. The method of claim 1, wherein the determining whether the block meets the segmenting requirement further comprises:
   determining whether a size of the block meets a segmenting threshold.

3. The method of claim 2, wherein the determining whether the size of the block meets the segmenting threshold further comprises at least one of:
   determining whether a column length of the block is larger than a first length threshold;
   determining whether a row length of the block is larger than a second length threshold; and
   determining whether an aspect ratio of the block is out of an aspect ratio range.

4. The method of claim 2, wherein when the size of the block meets the segmenting threshold, the block is divided in half to generate intermediate virtual block segments, and the intermediate virtual block segments are recursively divided in half until the size of the intermediate virtual block segments are below the segment threshold.

5. The method of claim 1, wherein the at least one second merge candidate has a same row number or a same column number as a corner neighbor of the block.

6. The method of claim 1, wherein the at least one second merge candidate is a top side neighbor or a left side neighbor of the block.

7. The method of claim 1, wherein the comparing the at least one motion vector predictor of each virtual block segment with the motion vector predictors of the block further comprises:
   selecting reference pixels for each of the block and the segmented virtual block segments, respectively;
   selecting reference blocks for each of the block and the segmented virtual block segments, respectively;
   comparing the selected reference pixels with corresponding reference pixels near the selected reference blocks for each of the block and the segmented virtual block segments, respectively, a difference between the selected reference pixels and the corresponding reference pixels near the selected reference block being defined as a motion vector predictor for each of the block and the segmented virtual block segments; and
   selecting a motion vector predictor having a lowest cost.

8. The method of claim 1, further comprising:
   reducing a number of the merge candidates in the merge candidate list based on decoder side motion vector derivation methods.

9. The method of claim 8, further comprising:
   setting up a reference cost for the decoder side motion vector derivation methods;
   performing the decoder side motion vector derivation methods on the merge candidates in the merge candidate list;
   comparing the costs of the merge candidates with the reference cost;
   determining whether a difference between the cost of each merge candidate and the reference cost is higher than a cost threshold; and
   removing a merge candidate from the merge candidate list, when the difference between the cost of the merge candidate and the reference cost is determined to be higher than the cost threshold.

10. An apparatus, comprising:
    processing circuitry configured to:
       decode prediction information for a block in a current coded picture that is a part of a coded video sequence, the prediction information being indicative of a merge mode;
       construct, in response to the merge mode, a merge candidate list of candidate motion vector predictors for the block, the merge candidate list including one or more first merge candidates that are corner neighbors of the block;
       determine whether different parts of the block have different motion vector predictors;
       insert at least one second merge candidates that is a side neighbor of the block into the merge candidate list, when different parts of the block are determined to have different motion vector predictors; and
       reconstruct the block according to the motion vector predictors in the merge candidate list, wherein the processing circuitry is further configured to
   determine whether the block meets a segmenting requirement,
   segment the block into virtual block segments so that each virtual block segment has at least one motion vector predictor, when the block is determined to meet the segmenting requirement, and
   compare the at least one motion vector predictor of each virtual block segment with the motion vector predictors of the block to select between a block-based merge mode or a segment-based merge mode.

11. The apparatus of claim 10, wherein the processing circuitry is further configured to:
   determine whether a size of the block meets a segmenting threshold.

12. The apparatus of claim 11, wherein the processing circuitry is further configured to:
   determine whether a column length of the block is larger than a first length threshold;
   determine whether a row length of the block is larger than a second length threshold; and
   determine whether an aspect ratio of the block is out of an aspect ratio range.

13. The apparatus of claim 11, wherein the processing circuitry is further configured to:
   divide the block in half to generate intermediate virtual block segments; and
   recursively divide the intermediate virtual block segments in half until the size of the intermediate virtual block segments are below the segment threshold.

14. The apparatus of claim 10, wherein the at least one second merge candidate has a same row number or a same column number as a corner neighbor of the block.

15. The apparatus of claim 10, wherein the at least one second merge candidate is a top side neighbor or a left side neighbor of the block.

16. The method of claim 10, wherein the processing circuitry is further configured to:
   select reference pixels for each of the block and the segmented virtual block segments, respectively;
   select reference blocks for each of the block and the segmented virtual block segments, respectively;
   compare the selected reference pixels with corresponding reference pixels near the selected reference blocks for each of the block and the segmented virtual block segments, respectively, a difference between the selected reference pixels and the corresponding reference pixels near the selected reference block being defined as a motion vector predictor for each of the block and the segmented virtual block segments; and
   select a motion vector predictor having a lowest cost.

17. The apparatus of claim 10, wherein the processing circuitry is further configured to:
   reduce a number of the merge candidates in the merge candidate list based on decoder side motion vector derivation methods.

18. A non-transitory computer-readable medium storing instructions which when executed by a computer for video decoding cause the computer to perform:
   decoding prediction information for a block in a current coded picture that is a part of a coded video sequence, the prediction information being indicative of a merge mode;
   constructing, in response to the merge mode, a merge candidate list of candidate motion vector predictors for the block, the merge candidate list including one or more first merge candidates that are corner neighbors of the block;
   determining whether different parts of the block have different motion vector predictors;
   inserting at least one second merge candidate that is a side neighbor of the block into the merge candidate list, when different parts of the block are determined to have different motion vector predictors; and
   reconstructing the block according to the motion vector predictors in the merge candidate list, wherein
   the determining whether different parts of the block have different motion vector predictors includes
      determining whether the block meets a segmenting requirement,
      segmenting the block into virtual block segments so that each virtual block segment has at least one motion vector predictor, when the block is determined to meet the segmenting requirement, and
      comparing the at least one motion vector predictor of each virtual block segment with the motion vector predictors of the block to select between a block-based merge mode or a segment-based merge mode.

* * * * *